US009280500B2

(12) United States Patent
Lee et al.

(10) Patent No.: US 9,280,500 B2
(45) Date of Patent: Mar. 8, 2016

(54) METHOD AND APPARATUS FOR PREVENTING STACK OVERFLOW IN EMBEDDED SYSTEM

(75) Inventors: Seung-won Lee, Hwaseong-si (KR);
Han-cheol Kim, Yongin-si (KR);
Young-sam Shin, Yongin-si (KR);
Min-kyu Jeong, Seoul (KR); Keun-soo Yim, Yongin-si (KR); Jeong-joon Yoo, Yongin-si (KR); Jae-don Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1552 days.

(21) Appl. No.: 12/003,947

(22) Filed: Jan. 3, 2008

(65) Prior Publication Data

US 2008/0168460 A1 Jul. 10, 2008

(30) Foreign Application Priority Data

Jan. 5, 2007 (KR) ........................ 10-2007-0001643

(51) Int. Cl.
*G06F 13/24* (2006.01)
*G06F 9/50* (2006.01)

(52) U.S. Cl.
CPC .............. *G06F 13/24* (2013.01); *G06F 9/5016* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| 5,950,221 | A | 9/1999 | Draves et al. |
| 6,167,488 | A | 12/2000 | Koppala |
| 6,779,180 | B1 * | 8/2004 | Palm .............................. 718/100 |
| 7,124,251 | B2 * | 10/2006 | Clark et al. ................... 711/132 |
| 2004/0034742 | A1 * | 2/2004 | Field et al. .................... 711/132 |
| 2004/0158678 | A1 | 8/2004 | Chen |
| 2007/0271441 | A1 * | 11/2007 | Shaw et al. ..................... 712/41 |
| 2010/0131803 | A1 * | 5/2010 | Lamie et al. .................... 714/38 |

FOREIGN PATENT DOCUMENTS

| JP | 9-198258 | 7/1997 |
| JP | 2006-285871 | 10/2006 |

OTHER PUBLICATIONS

Regehr et al.; Eliminating Stack Overflow by Abstract Interpretation; 2005; ACM.*
McCartney et al.; Abstractions for Safe Concurrent Programming in Networked Embedded Systems; 2006; ACM.*
Korean Office Action issued May 27, 2013 in corresponding Korean Application No. 10-2007-0001643.
Theo de Raadt, "Advances in OpenBSD", The OpenBSD Project, MagicPont Presentation foils, Apr. 2003, pp. 1-26 http://www.openbsd.gr/papers/csw03/mgp00001.html.

(Continued)

*Primary Examiner* — Corey S Faherty
(74) *Attorney, Agent, or Firm* — NSIP Law

(57) ABSTRACT

Provided is a method and apparatus for preventing a stack overflow in an embedded system. The method of preventing a stack overflow includes: reading a maximum stack usage of at least one function for executing a requested operation from maximum stack usages of functions provided from a kernel, which are stored in advance; and processing the requested operation on the basis of the read maximum stack usage of the at least one function and a size of a usable region in a stack for the requested operation. Accordingly, the stack overflow can be prevented without generating a run-time overhead.

16 Claims, 7 Drawing Sheets

(56) References Cited

OTHER PUBLICATIONS

Andreas Podelski, "Model Checking as Constraint Solving", pp. 1-16.

John Regehr et al. "Eliminating Stack Overflow by Abstract Interpretation", ACM Transactions on Embedded Computing Systems, vol. 4, No. 4, Nov. 2005, pp. 751-778.

\* cited by examiner

FIG. 2

| FUNCTION | ADDRESS | MAXIMUM STACK USAGE |
|---|---|---|
| a ( ) | 0x0001 | 20 byte |
| b ( ) | 0x00b4 | 30 byte |
| c ( ) | 0x00d8 | 15 byte |
| ⋮ | ⋮ | ⋮ |
| A ( ) | 0x145f | 50 byte |
| B ( ) | 0x15ea | 85 byte |
| ⋮ | ⋮ | ⋮ |

210 { (first group) 220 { (second group)

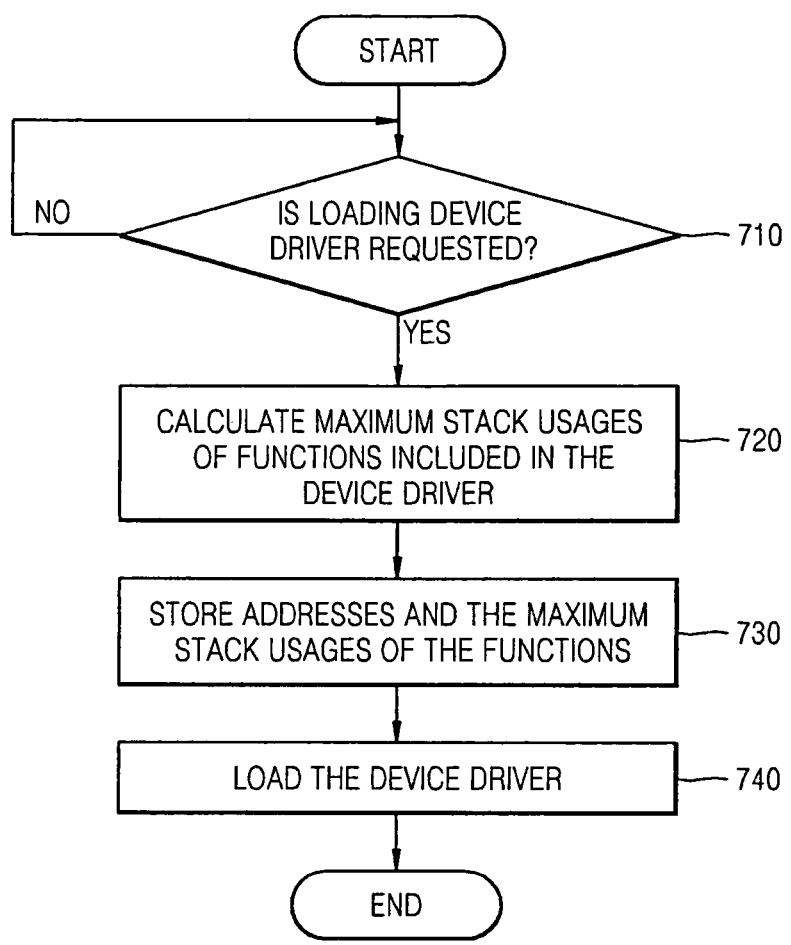

METHOD AND APPARATUS FOR PREVENTING STACK OVERFLOW IN EMBEDDED SYSTEM

CROSS-REFERENCE TO RELATED APPLICATIONS

This application claims the benefit of Korean Patent Application No. 10-2007-0001643, filed on Jan. 5, 2007, in the Korean Intellectual Property Office, the disclosure of which is incorporated herein in its entirety by reference.

BACKGROUND

1. Field

One or more embodiments relate to an embedded system, and more particularly, to a method and apparatus for preventing a stack overflow in an embedded system.

2. Description of the Related Art

An embedded system is a system in which a microprocessor or a microcontroller is embedded and designed to perform a dedicated function. The embedded system is also conventionally referred to as a particular application system that is a part of a large system, and includes hardware or software for performing a dedicated function. The embedded system is applied to various kinds of fields such as a control field including factory automation, home automation, robot control, and process control, a terminal device field including mobile phones, personal digital assistants (PDAs), smartphones, and location-based services (LBSs), an information domestic appliance field including printers, Internet refrigerators, games, and high-definition televisions (HDTVs), and a network device field including switches, routers, home servers, and home gateways.

The embedded system has strict restrictions in terms of cost, size, power consumption, and the like, such that it is not preferable that resources be allocated for a future request that cannot be predicted. Therefore, a resource request in a worst-case scenario has to be accurately analyzed in advance, and this analysis of the resource request also has to be performed on resources, such as memory, which can be easily and dynamically allocated and returned.

A stack is one of the resources of the embedded system that is most frequently used. Hence, a memory resource in the entire system is limited, so that a stack region is also limited. Therefore, when a particular task uses all of the stack allocated to the task and tries to access memory that is outside the region reserved for the stack to store information on the task, a problem occurs, that is, a stack overflow occurs.

Techniques for preventing the stack overflow are classified as a static analysis technique and a run-time check technique. The static analysis technique that is used to prevent stack overflow does not execute the program, however, analyzes the program itself. According to a type of a system that is to be analyzed, the static analysis technique that is used to prevent stack overflow is classified as a technique for analyzing a binary image and a technique for analyzing a source code. The static analysis technique involves a stack depth analysis technique using a control flow graph (CFG) and a technique using an abstract interpretation. According to the static analysis technique, since the amount of stack used is predicted offline, a run-time overhead does not occur. However, this technique cannot be applied to a system in which the components of the system are dynamically changed. Therefore, the static analysis technique is mainly applied to a closed system in which the components of the system are not changed.

The run-time check technique that is used to prevent stack overflow does not predict the amount of stack used, however, allocates a predetermined stack and checks whether the stack overflow occurs during run-time. The run-time check technique includes a compiler-generated run-time check technique and a non-executable stack technique, and the run-time check technique can be applied to a system in which components of the system are dynamically changed. However, the run-time check technique needs the support of compilers or hardware. Moreover, since whether the stack overflow occurs is continuously checked during run-time, a run-time overhead may occur.

SUMMARY

Additional aspects and/or advantages will be set forth in part in the description which follows and, in part, will be apparent from the description, or may be learned by practice of the invention.

Embodiments discussed herein provide a method and apparatus for preventing a stack overflow without generating a run-time overhead in an embedded system. Another embodiment discussed herein also provides a computer-readable medium having embodied thereon a computer program for executing the method.

According to an aspect of the embodiment, there is provided a method of preventing a stack overflow including: reading a maximum stack usage of at least one function for executing a requested operation from maximum stack usages of functions provided from a kernel, which are stored in advance; and selectively processing the requested operation on the basis of the read maximum stack usage of the at least one function and a size of a usable region in a stack for the requested operation.

The requested operation may be handling an interrupt, the at least one function may be an interrupt handler function corresponding to the interrupt, and the stack for the requested operation may be an interrupt stack. In this case, the operation of the processing may include the operations of determining whether a largest value of maximum stack usages of the interrupt handler functions exceeds a value obtained by subtracting the maximum stack usage of an interrupt handler function corresponding to the interrupt from the size of the usable region in the interrupt stack; and according to a result of the determination, if it is determined that the largest value exceeds the obtained value, prohibiting an occurrence of an additional interrupt, and calling the interrupt handler function.

The requested operation may be use of a device driver, the at least one function may be functions included in the device driver, and the stack for the requested operation may be a stack allocated to a thread which requests the use of the device driver. In this case, the operation of the processing may include the operations of determining whether a largest value of maximum stack usages of the functions included in the device driver exceeds a size of a usable region in the stack allocated to the thread which requests the use of the device driver; and according to a result of the determination, selectively calling the device driver.

According to another aspect of the embodiment, there is provided a method of preventing a stack overflow including: reading a maximum stack usage of a main function of a thread requested to be created from maximum stack usages of main functions of predetermined threads that are stored in advance; if a stack allocated to the thread already exists, selectively creating the thread on the basis of the read maximum stack usage and a size of the allocated stack; and if the stack allocated to the thread does not exist, selectively allocating a stack to the thread on the basis of the read maximum stack usage and a capacity of a currently usable memory, and creating the thread.

According to another aspect of the embodiment, there is provided a method of preventing a stack overflow including: if loading a thread image is requested, determining whether a maximum stack usage of a main function of the thread image exceeds a capacity of a currently usable memory; and according to a result of the determination, if it is determined that the maximum stack usage of the main function of the thread image does not exceed the capacity of the currently usable memory, storing the maximum stack usage of the main function of the thread image and loading the thread image.

According to another aspect of the embodiment, there is provided a computer-readable medium having embodied thereon a computer program for executing a method of preventing a stack overflow.

According to another aspect of the embodiment, there is provided an apparatus for preventing a stack overflow including: a stack usage storage to store maximum stack usages of functions provided from a kernel; and a processing module selectively to process a requested operation on the basis of a maximum stack usage of at least one function for executing the requested operation from among the maximum stack usages of the functions and a size of a usable region in a stack for the requested operation.

According to another aspect of the embodiment, there is provided an apparatus for preventing a stack overflow including: a stack usage storage storing maximum stack usages of main functions of predetermined threads; and a task module, if a stack allocated to a thread that requested to be created already exists, selectively creating the thread on the basis of a maximum stack usage of a main function of the thread from among the stored maximum stack usages and a size of the allocated stack, and if the stack allocated to the thread does not exist, selectively allocating a stack to the thread on the basis of the maximum stack usage of the main function of the thread from among the stored maximum stack usages and a capacity of a currently usable memory, and creating the thread.

According to another aspect of the embodiment, there is provided an apparatus for preventing a stack overflow including: a stack usage calculator calculating a maximum stack usage of a main function of a thread image that requested to be loaded; a stack usage storage storing the calculated maximum stack usage; and a dynamic loading module selectively loading the thread image on the basis of the calculated maximum stack usage and a capacity of a currently usable memory.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a view of an example of storing data in a stack usage storage, according to an embodiment;

FIG. 7 is a flowchart of a method of processing a request for loading a device driver, according to an embodiment.

DETAILED DESCRIPTION OF THE EMBODIMENTS

Figure 1:
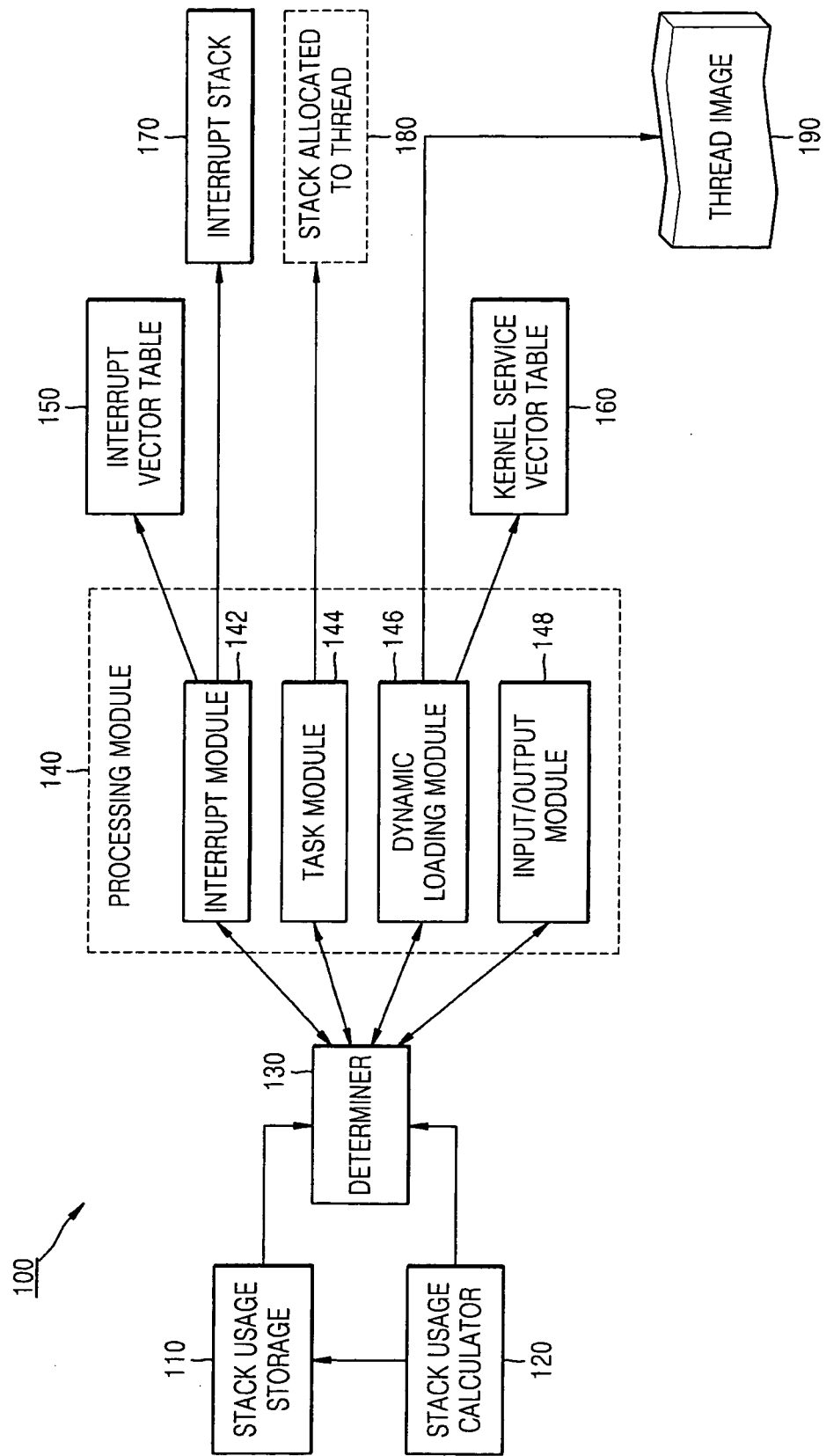
FIG. 1 is a block diagram of an apparatus for preventing a stack overflow of an embedded system, according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a block diagram of an apparatus 100 for preventing a stack overflow of an embedded system, according to an embodiment. Referring to FIG. 1, the apparatus 100 for preventing a stack overflow includes a stack usage storage 110, a stack usage calculator 120, a determiner 130, a processing module 140, an interrupt vector table 150, and a kernel service vector table 160. The stack usage storage 110, the stack usage calculator 120, the determiner 130, and the processing module 140 may be included in a kernel of the embedded system.

The stack usage storage 110 stores addresses of functions provided from the kernel, a maximum stack usage used by each of the functions, an address of a main function of each of the threads that are loaded on the kernel, and a maximum stack usage of each of the main functions. The stack usage storage 110 may store the addresses and the maximum stack usages of the functions in a table form. The functions provided from the kernel include interrupt handler functions and functions included in a device driver.

FIG. 2 is a view of an example of storing data in the stack usage storage 110, according to an embodiment. Referring to FIG. 2, the stack usage storage 110 stores the addresses and the maximum stack usages of functions 210 provided from the kernel, and the addresses and the stack usages of main functions 220 of threads loaded on the kernel, in a table form.

When loading a thread image 190 or a device driver is requested, the stack usage calculator 120 calculates a maximum stack usage of a main function of the thread image 190 that is to be loaded or maximum stack usages of the functions included in the device driver that is to be loaded. The stack usage calculator 120 may calculate the maximum stack usage of the main function of the thread image 190 that is to be loaded by using the maximum stack usages of functions included in the main function of the thread image 190 that is to be loaded from among the maximum stack usages of the functions stored in the stack usage storage 110, using a static analysis. Similarly, the maximum stack usages of the functions included in the device driver may be calculated by using the stack analysis.

Otherwise, the maximum stack usage of the thread image 190 may be determined by using a simulation in advance. In this case, a determined maximum stack usage is stored in the stack usage calculator 120 in advance, and when the corresponding thread image 190 is loaded, the determined maximum stack usage is stored in the stack usage storage 110. Otherwise, a maximum stack usage determined by using the simulation in advance is stored in the thread image 190, and a dynamic loading module 146 reads the maximum stack usage stored in the thread image 190 that is to be loaded in order to store the read maximum stack usage in the stack usage storage 110.

The processing module 140 processes requested operations and includes an interrupt module 142 for managing interrupt handling, a task module 144 for managing thread creation, the dynamic loading module 146 for managing loading of a new thread image 190 or a device driver, and an input/output module 148 for processing a device driver use request. The processing module 140 selectively processes the requested operations on the basis of maximum stack usage of functions for executing the requested operations from among the maximum stack usages of the functions stored in the stack usage storage 110, a size of a usage region in a stack for the requested operations, or a capacity of a currently usable memory.

When an interrupt occurs, the interrupt module 142 retrieves an interrupt handler function corresponding to the occurred interrupt from the interrupt vector table 150 which stores a list of the interrupt handler functions. The determiner 130 determines whether a largest value of maximum stack usages of the interrupt handler functions stored in the stack usage storage 110 exceeds a value obtained by subtracting the maximum stack usage of the retrieved interrupt handler function from a size of a usable region in an interrupt stack 170.

According to a result of the determination of the determiner 130, if the largest value of the maximum stack usages of the stored interrupt handler functions does not exceed the value obtained by subtracting the maximum stack usage of the retrieved interrupt handler function from the size of the usable region in the interrupt stack 170, the interrupt module 142 calls the retrieved interrupt handler function. However, according to the result of the determination of the determiner 130, if the largest value of the maximum stack usages of the stored interrupt handler functions exceeds the value obtained by subtracting the maximum stack usage of the retrieved interrupt handler function from the size of the usable region in the interrupt stack 170, the interrupt module 142 prohibits an occurrence of an additional interrupt, calls the retrieved interrupt handler function, and allows the occurrence of another interrupt when interrupt handling is completed.

If the largest value of the maximum stack usages of the interrupt handler functions exceeds the value obtained by subtracting the maximum stack usage of the interrupt handler function corresponding to the current interrupt from the size of the usable region in the interrupt stack 170, that is, exceeds a size of a stack used to handle an interrupt which can additionally occur, a stack overflow of an interrupt stack may occur when the additional interrupt occurs during the handling of the current interrupt. Therefore, in this case, the occurrence of the additional interrupt is prohibited to prevent the stack overflow.

If a currently executed thread requests the use of the device driver, the input/output module 148 selectively calls a corresponding device driver according to a result of determination of the determiner 130. If the thread requests the use of the device driver, the determiner 130 determines whether a largest value of the maximum stack usages of the functions included in the device driver, which are stored in the stack usage storage 110, exceeds a size of a usage region in a stack allocated to the thread. According to a result of determination of the determiner 130, if the largest value of the maximum stack usages of the functions included in the device driver exceeds the size of the usage region in the stack allocated to the thread, the corresponding device driver is not called, and only when the largest value does not exceed the size, the corresponding device driver is called.

If the largest value of the maximum stack usages of the functions included in the device driver of which the use is requested exceeds the size of the usable region in the stack allocated to the thread, and the device driver is called, a stack overflow may occur. Therefore, in this case, the device driver is not called to prevent the stack overflow.

When the task module 144 is requested to create a thread from an application, the task module 144 selectively creates the thread according to a result of determination of the determiner 130. Hence, when a stack is not allocated to the thread that is requested to be created, the task module 144 allocates a stack and creates the thread.

When creating the thread is requested from the application, the task module 144 first examines whether a stack 180 allocated to the thread that is requested to be created exists. According to the application, the stack may be allocated when the thread is created, or the stack may be allocated in advance.

According to a result of the examination, when the stack 180 allocated to the thread already exists, the determiner 130 determines whether a maximum stack usage of a main function of the thread, which is stored in the stack usage storage 110, exceeds a size of the stack 180 allocated to the thread. If the maximum stack usage of the main function of the thread exceeds the size of the stack 180 allocated to the thread, the task module 144 does not create the thread, and only if the maximum stack usage does not exceed the size of the stack 180 allocated to the thread, the task module 144 creates the thread.

In addition, according to the result of the examination, if the stack 180 allocated to the thread does not exist, the determiner 130 determines whether the maximum stack usage of the main function of the thread, which is stored in the stack usage storage 110, exceeds a capacity of a currently usable memory. Hence, the determination is to determine whether a stack 180 corresponding to the maximum stack usage can be allocated to the thread. If the maximum stack usage of the main function of the thread exceeds the capacity of the currently usable memory, the task module 144 does not create the thread, and if the maximum stack usage does not exceed the capacity of the currently usable memory, the task module 144 allocates the stack 180 to the thread and creates the thread. The task module 144 may allocate the stack 180 corresponding to the maximum stack usage of the main function of the thread, which is stored in the stack usage storage 110, to the thread.

When creating the thread is requested and the stack 180 allocated to the thread exists, that is, the maximum stack usage of the main function of the thread exceeds the size of the allocated stack 180, or when the stack 180 allocated to the thread does not exist and a stack 180 has to be allocated to the thread, that is, the maximum usage of the main function of the thread exceeds the capacity of the currently usable memory, a stack overflow may occur. Therefore, in this case, the thread is not created in order to prevent the stack overflow.

The dynamic loading module 146 loads the thread image 190 or the device driver on a memory located in the kernel. Particularly, when the dynamic loading module 146 loads the thread image 190, the dynamic loading module 146 selectively loads the thread image 190 according to whether the stack corresponding to the maximum stack usage of the main function of the thread image 190 can be allocated. Hence, whether the stack corresponding to the maximum stack usage can be allocated is determined by the maximum stack usage of the main function of the thread image 190 and the capacity of the currently usable memory.

The operations of the dynamic loading module 146 will be described in detail as follows. When loading a thread image is requested, the determiner 130 determines whether the maximum stack usage of the main function of the thread image 190, which is stored in advance or calculated by the stack usage calculator 120, exceeds the capacity of the currently usable memory. According to a result of the determination of the determiner 130, if the maximum stack usage does not exceed the capacity of the currently usable memory, the dynamic loading module 146 stores an address and the maximum stack usage of the main function of the thread image 190 in the stack usage storage 110, and loads the thread image 190. However, if the maximum stack usage exceeds the capacity of the currently usable memory, that is, when a stack corresponding to the maximum stack usage cannot be allocated, whether a stack can be allocated to another region outside the currently usable memory is considered. For example, when the currently usable memory is a random-access memory (RAM), whether the stack can be allocated to a region such as a flash memory is considered. According to a result of the consideration, if the stack can be allocated to another region, the dynamic loading module 146 loads the thread image 190, or otherwise, the dynamic loading module 146 does not load the thread image 190. When the dynamic loading module 146 loads the thread image 190, the dynamic loading module 146 connects the main function of the thread image 190 to functions of the main function of the kernel service vector table 160 which stores a list of the functions provided from the kernel.

When loading the device driver is requested, the stack usage calculator 120 calculates the maximum stack usages of the functions included in the device driver and stores addresses and the calculated maximum stack usages of the functions in the stack usage storage 110, and the dynamic loading module 146 loads the device driver.

Figure 3:
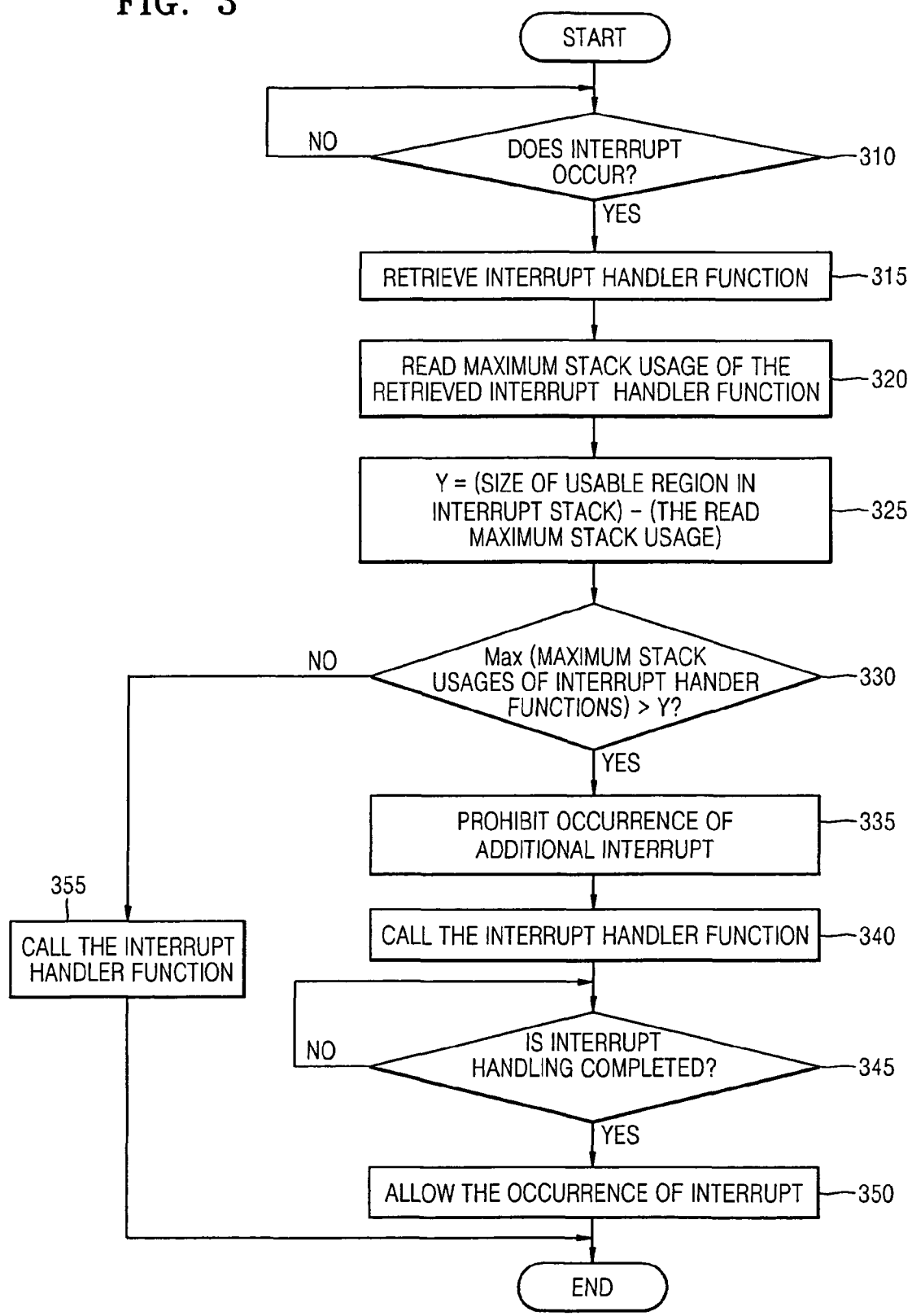
FIG. 3 is a flowchart of a method of preventing a stack overflow during interrupt handling, according to an embodiment.

FIG. 3 is a flowchart of a method of preventing a stack overflow during interrupt handling, according to an embodiment.

If an interrupt occurs in operation 310, the apparatus 100 for preventing a stack overflow retrieves an interrupt handler function corresponding to the interrupt from the interrupt vector table 150 in operation 315.

In operation 320, the apparatus 100 for preventing a stack overflow reads a maximum stack usage of the retrieved interrupt handler function from the stack usage storage 110.

In operation 325, the apparatus 100 for preventing a stack overflow obtains a Y value by subtracting the read maximum stack usage of the retrieved interrupt handler function from a size of a usable region in the interrupt stack 170.

In operation 330, the apparatus 100 for preventing a stack overflow determines whether a largest value of maximum stack usages of the interrupt handler functions exceeds the Y value obtained in operation 325. According to a result of the determination, if it is determined that the largest value of the maximum stack usages of the interrupt handler functions exceeds the Y value obtained in operation 325, operation 335 is performed, or otherwise, operation 355 is performed.

In operation 355, the apparatus 100 for preventing a stack overflow calls the retrieved interrupt handler function.

In operation 335, the apparatus 100 for preventing a stack overflow prohibits an occurrence of an additional interrupt. In operation 340, the apparatus 100 calls the retrieved interrupt handler function. When the interrupt handling is completed by executing the called interrupt handler function in operation 345, the apparatus 100 for preventing a stack overflow allows the occurrence of an additional interrupt in operation 350.

Figure 4:
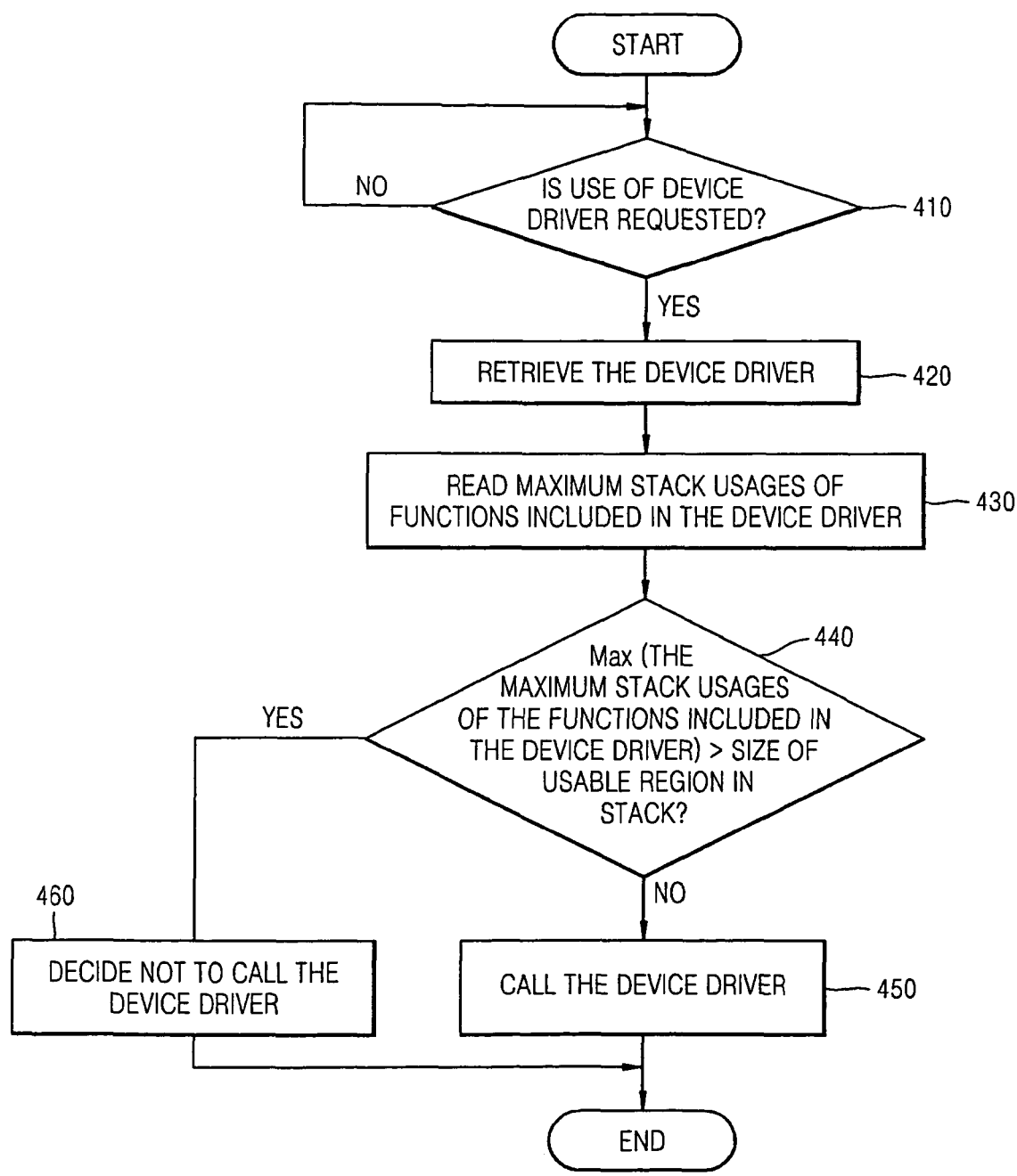
FIG. 4 is a flowchart of a method of preventing a stack overflow during the processing of a device driver use request, according to an embodiment.

FIG. 4 is a flowchart of a method of preventing a stack overflow during the processing of a request of the use of a device driver, according to an embodiment.

In operation 410, if a thread requests the use of a device driver, operation 420 is performed such that the apparatus 100 for preventing a stack overflow retrieves a corresponding device driver.

In operation 430, the apparatus 100 for preventing a stack overflow reads maximum stack usages of functions included in the corresponding device driver from the stack usage storage 110.

In operation 440, the apparatus 100 for preventing a stack overflow determines whether a largest value of the maximum stack usages of the functions included in the corresponding device driver exceeds a size of a usable region in a stack allocated to the thread which requested the device driver. According to a result of the determination, if it is determined that the largest value of the maximum stack usages of the functions included in the corresponding device driver exceeds the size of the usable region in the stack allocated to the thread which requested the use of the device driver, operation 460 is performed, or otherwise, operation 450 is performed.

In operation 460, the apparatus 100 for preventing a stack overflow decides not to call the device driver that was requested to be used.

In operation 450, the apparatus 100 for preventing a stack overflow calls the device driver that was requested to be used.

Figure 5:
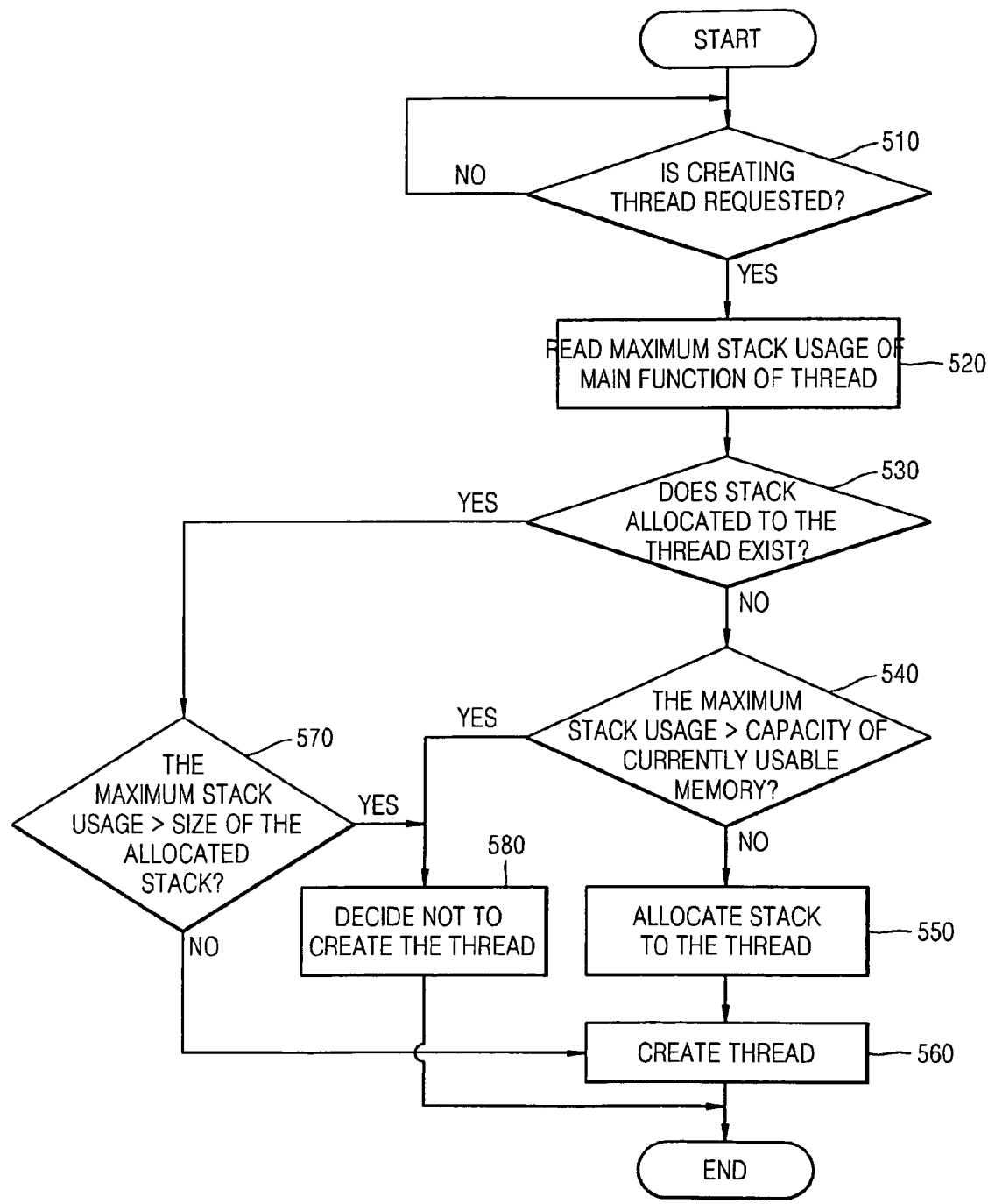
FIG. 5 is a flowchart of a method of preventing a stack overflow during thread creation, according to an embodiment.

FIG. 5 is a flowchart of a method of preventing a stack overflow during thread creation, according to an embodiment of the present invention.

If creating a thread is requested in operation 510, the apparatus 100 for preventing a stack overflow reads a maximum stack usage of a main function of the thread from the stack usage storage 110 in operation 520.

In operation 530, the apparatus 100 for preventing a stack overflow determines whether a stack allocated to the thread exists. According to a result of the determination, if it is determined that the stack allocated to the thread exists, operation 570 is performed, or otherwise, operation 540 is performed.

In operation 540, the apparatus 100 for preventing a stack overflow determines whether the maximum stack usage of the main function of the thread exceeds a capacity of a currently usable memory. If the maximum stack usage of the main function of the thread exceeds the capacity of the currently usable memory, it means that the stack corresponding to the maximum stack usage cannot be allocated to the thread. According to a result of the determination, if the maximum stack usage of the main function of the thread does not exceed the capacity of the currently usable memory, operation 550 is performed to allocate the stack corresponding to the maximum stack usage to the thread, and in operation 560, the thread is created. However, according to the result of the determination, when the maximum stack usage of the main function of the thread exceeds the capacity of the currently usable memory, operation 580 is performed, and as such, the apparatus 100 for preventing a stack overflow decides not to create the thread.

In operation 570, the apparatus 100 for preventing a stack overflow determines whether the maximum stack usage exceeds the size of the stack allocated to the thread. According to a result of the determination, if it is determined that the maximum stack usage does not exceed the size of the stack allocated to the thread, operation 560 is performed so as to create the thread. However, according to the result of the determination, if it is determined that the maximum stack usage exceeds the size of the stack allocated to the thread, operation 580 is performed so as not to create the thread.

Figure 6:
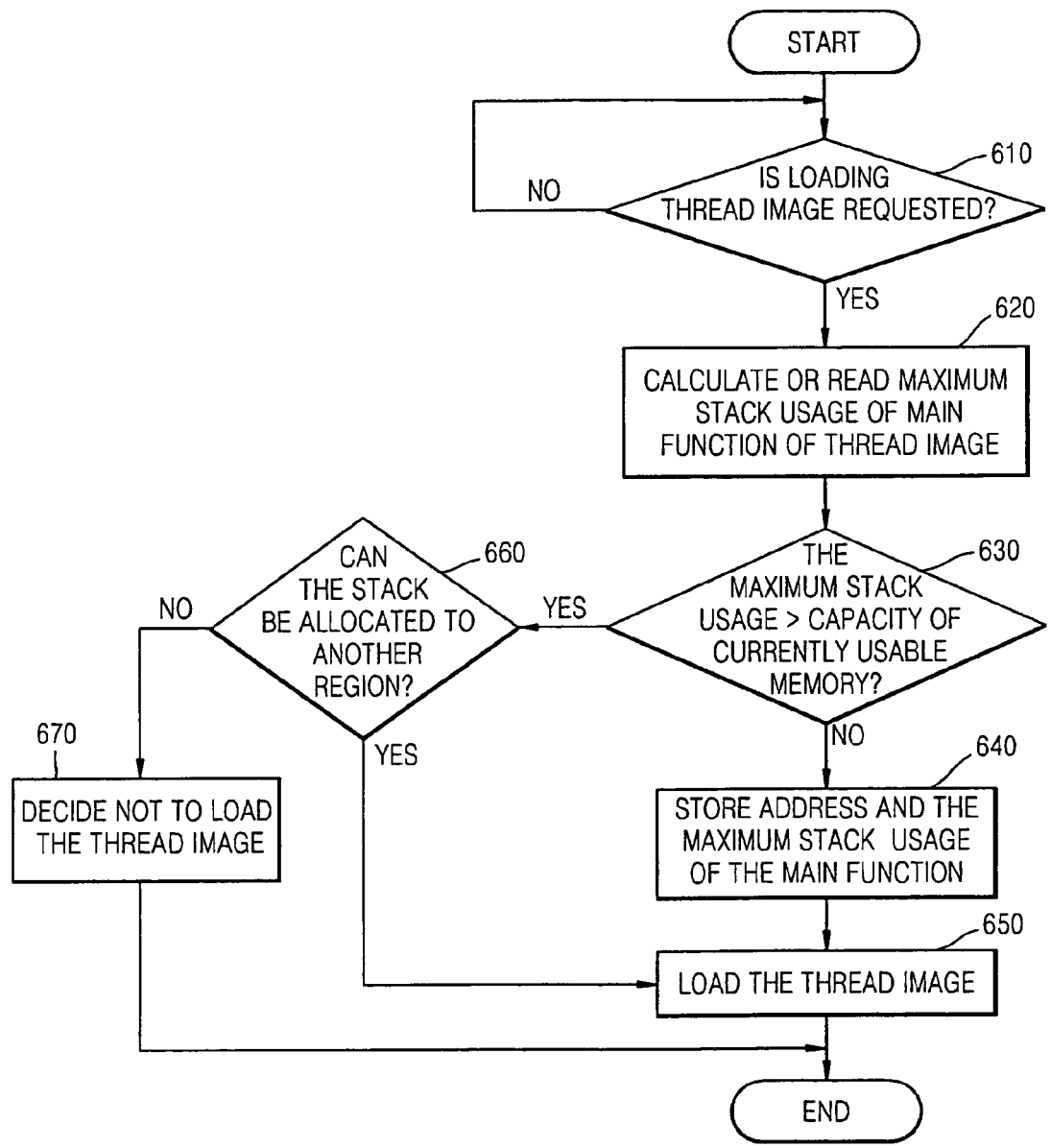
FIG. 6 is a flowchart of a method of processing a request for loading a thread image, according to an embodiment.

FIG. 6 is a flowchart of a method of processing a request for loading a thread image, according to an embodiment of the present invention.

In operation 610, if loading the thread image is requested, the apparatus 100 for preventing a stack overflow calculates a maximum stack usage of a main function of the thread image or reads a predetermined maximum stack usage in operation 620.

If the maximum stack usage of the main function of the thread image is calculated, the maximum stack usage may be calculated by using maximum stack usages of functions included in the main function of the thread image from among maximum stack usages of functions stored in the stack usage storage 110 using the static analysis. On the other hand, if the predetermined maximum stack usage of the main function of the thread image is read, the maximum stack usage is predetermined by using a simulation in advance and stored in the stack usage calculator 120 or in the thread image, in order for the maximum stack usage to be read.

In operation 630, the apparatus 100 for preventing a stack overflow determines if the maximum stack usage of the main function of the thread image exceeds a capacity of a currently usable memory. According to a result of the determination, if it is determined that the maximum stack usage of the main function of the thread exceeds the capacity of the currently usable memory, operation 660 is performed, or otherwise, operation 640 is performed.

In operation 640, the apparatus 100 for preventing a stack overflow stores an address and the maximum stack usage of the main function of the thread image in the stack usage storage 110. Thereafter, in operation 650, the thread image is loaded.

In operation 660, the apparatus 100 for preventing a stack overflow determines whether a stack can be allocated to another region outside the currently usable memory, for example, a region such as a flash memory. According to a result of the determination, if it is determined that the stack can be allocated to the region outside the currently usable memory, operation 650 is performed, and if the stack cannot be allocated to the region outside the currently usable memory, operation 670 is performed.

In operation 670, the apparatus 100 for preventing a stack overflow decides not to load the thread image.

FIG. 7 is a flowchart of a method of processing a request for loading a device driver, according to an embodiment.

In operation 710, if loading a device driver is requested, in operation 720, the apparatus 100 for preventing a stack overflow calculates maximum stack usages of functions included in the device driver.

In operation 730, the apparatus 100 for preventing a stack overflow stores addresses and the calculated maximum stack usages of the functions included in the device driver in the stack usage storage 110.

In operation 740, the apparatus 100 for preventing a stack overflow loads the device driver.

Accordingly, the maximum stack usages of functions provided from the kernel or the main function of the thread are stored, and the stored maximum stack usage, the allocated stack, and the capacity of the usable memory are compared with each other to selectively process the operations. Therefore, whether a stack overflow occurs needs not be continuously checked during run-time, so that the stack overflow can be prevented without generating a run-time overhead.

In addition, a maximum stack usage of a main function of each thread is stored, so that a stack corresponding to the maximum stack usage can be allocated during thread creation, and memory resources can be effectively used.

The embodiments of the present invention can be written as computer programs and can be implemented in general-use digital computers that execute the programs using a computer readable recording medium. In addition, a data structure used in the embodiments of the present invention can be written in a computer readable recording medium through various means. Examples of the computer readable recording medium include magnetic storage media (e.g., ROM, floppy disks, hard disks, etc.), optical recording media (e.g., CD-ROMs, or DVDS), and storage media such as carrier waves (e.g., transmission through the Internet).

While the present invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of preventing a stack overflow comprising:
    reading a maximum stack usage of at least one function for executing a requested operation from maximum stack usages of functions provided from a kernel; and
    processing the requested operation if the read maximum stack usage of the at least one function is smaller than a size of a usable region in a stack for the requested operation.

2. The method of claim 1, wherein the requested operation is handling an interrupt, the at least one function is an interrupt handler function corresponding to the interrupt, and the stack for the requested operation is an interrupt stack.

3. The method of claim 2, wherein the processing the requested operation comprises:
    determining whether a largest value of maximum stack usages of interrupt handler functions exceeds a value obtained by subtracting the maximum stack usage of the interrupt handler function corresponding to the interrupt from the size of the usable region in the interrupt stack; and
    according to a result of the determination, if it is determined that the largest value exceeds the obtained value, prohibiting an occurrence of an additional interrupt, and calling the interrupt handler function.

4. The method of claim 1, wherein the requested operation is use of a device driver, the at least one function are functions included in the device driver, and the stack for the requested operation is a stack allocated to a thread which requests the use of the device driver.

5. The method of claim 4, wherein the processing the requested operation comprises:
    determining whether a largest value of maximum stack usages of the functions included in the device driver exceeds a size of a usable region in the stack allocated to the thread which requests the use of the device driver; and
    according to a result of the determination, calling the device driver.

6. A method of preventing a stack overflow comprising:
determining whether a maximum stack usage of a main function of a thread image exceeds a capacity of a currently usable memory if loading the thread image is requested; and
storing the maximum stack usage of the main function of the thread image and loading the thread image if it is determined that the maximum stack usage of the main function of the thread image does not exceed the capacity of the currently usable memory, according to a result of the determination.

7. The method of claim 6, wherein the determining comprises calculating the maximum stack usage of the main function of the thread image by using a static analysis.

8. The method of claim 6, wherein the maximum stack usage of the main function of the thread image is predetermined by using a simulation.

9. The method of claim 6, wherein, according to the result of the determination, if the maximum stack usage of the main function of the thread image exceeds the capacity of the currently usable memory, loading the thread image only if a stack can be allocated to a region outside the currently usable memory.

10. A non-transitory computer-readable medium having embodied thereon a computer program for the method of preventing a stack overflow of claim 1.

11. An apparatus for preventing a stack overflow comprising:
a stack usage storage to store maximum stack usages of functions of a kernel; and
a processing module to process a requested operation on the basis of a maximum stack usage of at least one function for executing the requested operation from among the maximum stack usages of the functions and a size of a usable region in a stack for the requested operation.

12. The apparatus of claim 11,
wherein the requested operation is handling an interrupt, the at least one function is an interrupt handler function corresponding to the interrupt, and the stack for the requested operation is an interrupt stack,
wherein the apparatus further comprises a determiner determining whether a largest value of the maximum stack usages of the interrupt handler functions exceeds a value obtained by subtracting the maximum stack usage of the interrupt handler function corresponding to the interrupt from the size of the usable region in the interrupt stack, and
wherein the processing module comprises an interrupt module to prohibit an occurrence of an additional interrupt and to call the corresponding interrupt handler function when the determiner determines that the largest value exceeds the obtained value.

13. The apparatus of claim 11,
wherein the requested operation is use of a device driver, the at least one function are functions included in the device driver, the stack for the requested operation is a stack allocated to a thread which requests the use of the device driver,
wherein the apparatus further comprises a determiner to determine whether a largest value of the maximum stack usages of the functions included in the device driver exceeds the size of the usable region in the stack allocated to the thread which requests the use of the device driver, and
wherein the processing module comprises an input/output module calling the device driver according to a result of the determination of the determiner.

14. An apparatus for preventing a stack overflow comprising:
a stack usage calculator to calculate a maximum stack usage of a main function of a thread image that requested to be loaded;
a stack usage storage to store the calculated maximum stack usage; and
a dynamic loading module to load the thread image if the calculated maximum stack usage is less than a capacity of a currently usable memory.

15. The apparatus of claim 14, wherein the stack usage calculator calculates the maximum stack usage by using a static analysis.

16. The apparatus of claim 14,
wherein the stack usage calculator calculates maximum stack usages of functions included in a device driver that requested to be loaded, and
wherein the stack usage storage stores the calculated maximum stack usages of the functions included in the device driver.

* * * * *